Oct. 1, 1940.　　　　R. R. MOORE　　　　2,216,600
MEANS AND METHOD FOR DEVELOPING EXPLORING
MAGNETISM IN PARAMAGNETIC BODIES
Filed Nov. 8, 1938　　　　2 Sheets-Sheet 1
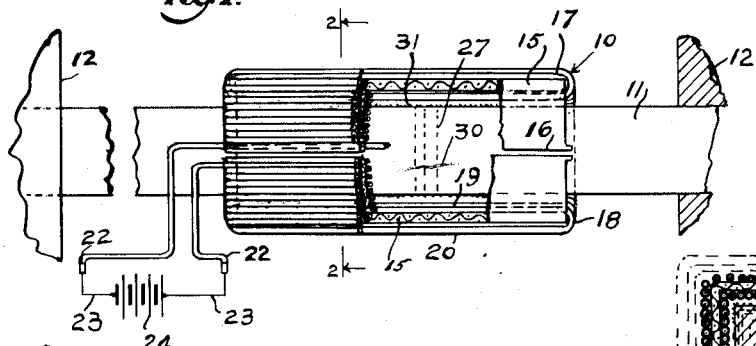
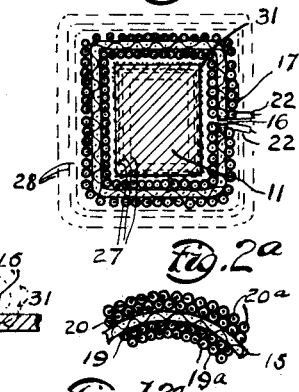
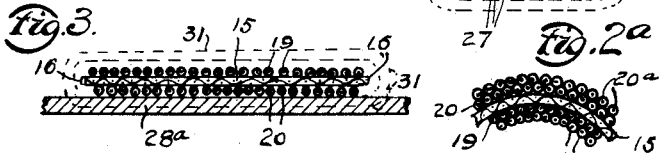
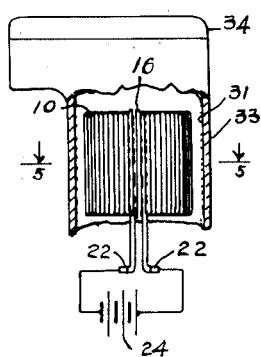
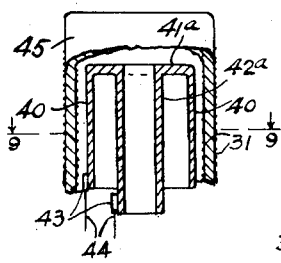
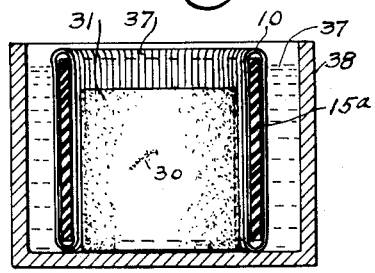
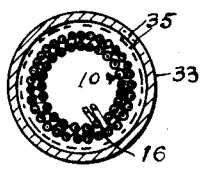
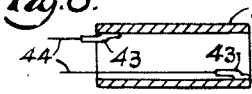
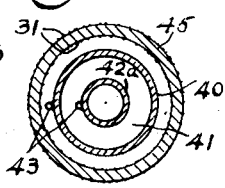
INVENTOR:
Richard R. Moore,
BY
Harold D. Penney, ATTORNEY.

Oct. 1, 1940.   R. R. MOORE   2,216,600
MEANS AND METHOD FOR DEVELOPING EXPLORING
MAGNETISM IN PARAMAGNETIC BODIES
Filed Nov. 8, 1938   2 Sheets-Sheet 2
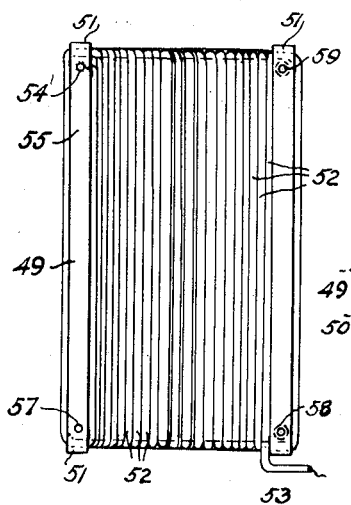
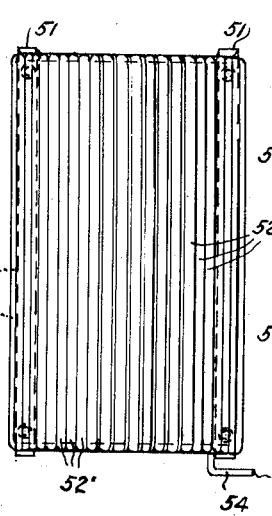
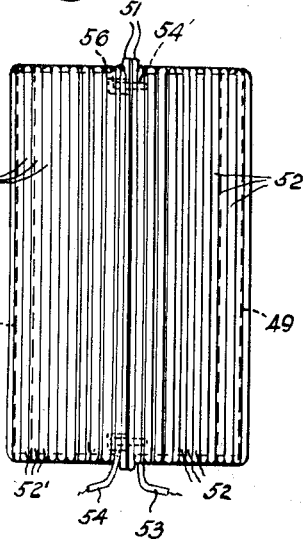
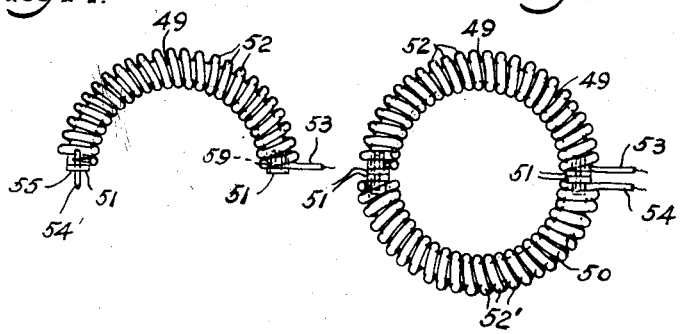
INVENTOR:
Richard R. Moore;
BY
Harold D. Penney, ATTORNEY.

Patented Oct. 1, 1940

2,216,600

UNITED STATES PATENT OFFICE 2,216,600

MEANS AND METHOD FOR DEVELOPING EXPLORING MAGNETISM IN PARAMAGNETIC BODIES

Richard R. Moore, Lansdowne, Pa.

Application November 8, 1938, Serial No. 239,434

34 Claims. (Cl. 175—183)

This invention relates to a means and methods for developing magnetization in paramagnetic metal bodies or structures for the purpose of detecting hardening cracks, breaks, flaws or other defects therein. Such paramagnetic bodies are hereinafter referred to as work pieces.

Objects of the invention are to provide means and methods for detecting certain flaws which could not be practically tested heretofore, such as hollow work pieces having a closed end which does not permit of passing a current through the work piece, and which does not permit of the passing therethrough of conductive bar, and for testing without the passage of electric current through the object to be tested.

In order to make the tests magnetically it is necessary to cause magnetic flux in the work piece to be tested, the flux being so arranged that the body will be without poles at the faces of the piece where it is to be tested, unless there are defects in the piece which cause leakage, and therefore, poles at the defects. The work piece to be tested is first thus magnetized and then a fine paramagnetic iron powder is dusted over the work, or a liquid solution containing the paramagnetic powder in suspension is flushed over the work piece or the work piece may be immersed in the solution. The presence of the poles developed at the defects is disclosed by the formation and adherence of powder patterns, at the location of the defects. The most satisfactory indications of defects are obtained when the flux is nearly 90° to the long axis of the defect. If the long axis of the defect is parallel to the long axis of the work piece, flux caused by passing an electric current longitudinally through the work piece will cause the flux to be perpendicular to the long axis of the defect. However, this method of passing strong currents through the work piece may burn and injure the work where the current is introduced.

Therefore, objects of my invention are to provide means and methods for producing magnetic flux at right angles to defects that are nearly parallel to the long axis of the work, and to produce flux without introducing current into the work piece.

If the work is hollow and open at both ends, flux lines may be produced by passing an electric current through a copper bar projecting through the hole in the work. In this case the work becomes magnetized by induction from the circular field formed around the copper bar by the current that passes therethrough. The bar does not have to be copper but should be some non-magnetic electrical conductor such as copper or aluminum, in order that the conductor shall not absorb some of the field and cause a loss of flux in the work piece. However, if the hollow part is closed at one end, then this copper bar method is not practical because the bar cannot be passed through the work to make electrical contact at both ends to complete the electrical circuit. If the closed end is made of material that will not conduct a current, it is very difficult to apply the method of passing a current through the work.

Therefore, other objects of my invention are to provide means and methods for directing magnetic flux through various irregular and hollow magnetic bodies, or hollow magnetic bodies having one closed non-conductive end.

Additional objects of the invention are to improve generally the simplicity and efficiency of such methods and apparatus and to provide an extremely simple device or apparatus of this kind which is economical, durable, and reliable in operation, and economical to manufacture and install.

Still other objects of the invention will appear as the description proceeds; and while herein details of the invention are described in the specification and some of the claims, the invention is not limited to these, since many and various changes may be made without departing from the scope of the invention as claimed in the broader claims.

The inventive features for the accomplishment of these and other objects are disclosed herein in connection with a testing means which briefly stated, includes means for causing a large number of amperes of electric current to pass in the same direction through adjacent paths of limited length substantially parallel to each other and the axis of the work piece and adjacent to its surface, on which surface finely divided paramagnetic material has been placed, whereby the electric current generates magnetic flux passing around the assembly of paths largely within said work piece at said surface, whereby the magnetic flux lines are transverse to said paths and may cause the collection of the divided paramagnetic material in patterns at the flaws that are parallel to said paths.

In the accompanying drawings showing, by way of example, several of many possible embodiments of the invention, Fig. 1 is a fragmental front or side elevation, partly in longitudinal section, showing one form of the testing means or apparatus as used in detecting flaws in a non-cylindrical, preferably rectangular work piece;

Fig. 2 shows a transverse section taken substantially on the line of 2—2 Fig. 1, looking in the direction of the arrows of said line;

Fig. 2a is a fragmental transverse sectional view showing a portion of a modified form of the invention;

Fig. 3 shows a fragmental section of the testing means of Fig. 1 in flat condition;

Fig. 4 is a fragmental vertical sectional view, partly in elevation, showing the testing means applied to the interior of a hollow, preferably cylindrical work piece;

Fig. 5 shows a transverse section taken substantially on the line of 5—5 Fig. 4, looking in the direction of the arrows of said line;

Fig. 6 is a fragmental, vertical sectional view showing another form and use of the invention;

Fig. 7 is a fragmental vertical sectional view, partly in elevation, showing still another form of the invention;

Fig. 8 is a longitudinal section of another form of the invention;

Fig. 9 shows a section taken substantially on the line of 9—9 Fig. 7, looking in the direction of the arrows of said line;

Fig. 10 is a view, in elevation of a half section modified form of testing coil;

Fig. 11 is a view in elevation showing the testing coil of Fig. 10 in assembly;

Fig. 12 is a side view of Fig. 11;

Fig. 12a is a transverse sectional view of one of the insulated conductors illustrated in Fig. 2a;

Fig. 13 is an end view of Fig. 11; and

Fig. 14 is an end view of Fig. 10.

While in this specification and the claims mention is made of the bottom, top, ends, front and rear of the parts and it is stated that one part is moved toward or from another rather than vice versa, it is understood that these words are used for designation and description and that for purposes of protection they are to be construed broadly enough to cover other relative movements, arrangements, dimensions or positions than as shown, and in general all terms of the claims are to be given, for the purposes of protection, broad interpretation when possible.

In one of the forms shown herein, the testing coil may be made of a non-flexible dielectric tubular core having a conductive winding around the wall of the tube which is arranged to lie parallel to the axis of the core, and which may be used to receive in its inner bore a work piece to be tested or to be inserted into a work piece which is hollow.

A further modified coil form, as will hereinafter be described in detail, is in its operative assembly, made up of two non-flexible connective sections, which may be separated into longitudinal halves, for embracing work pieces for test, where it is not feasible or practical to otherwise magnetize the work piece.

If such a coil is made up in the half-cylinder core style, the core itself being made of steel, electro-magnets are produced which develop a bi-polar flux.

The test devices disclosed herein, in use with alternating current, become useful as demagnetizers, and due to the split construction of one of the forms shown herein, this form is adaptable for demagnetizing air-plane parts, in situ, where it is otherwise impossible to so treat said parts. This feature also applies to the flexible core.

A further feature of advantage, as will later appear, is that the split form of coil is more easily wound than is possible with a complete tubular core.

The testing device or coils Figs. 1 and 10 to 14 are particularly adapted for testing for flaws parallel to the axis of the magnetic work pieces, such as the work piece 11 of Fig. 1, where the elongated structure is fixed as between other end structures 12 which are too large to allow a solid, closed coil to be slipped over the end of the structure 11—12.

The flexible coil 10 of Figure 1 is helically wound about a flexible, flat, core or body 15 of canvas or leather strips or belting or other suitable dielectric material adapted to be bent to form a tubular body having a longitudinal split 16.

A helix of insulated conductor wire 17 substantially covers the body, each convolution of the helix comprising portions 18 disposed transversely across and around the side edges of the flexible body 15, and portions 19—20 being disposed transversely along the respective inner and outer faces of the tube 15, when in the flat, substantially parallel to each other and to the axis of the tube, when erected in tube form.

In some instances, the coil of Figs. 1, 2a, 4, 5, 6 and 7 to 11 inclusive may be made on a non-flexible core of dielectric material of either rectangular, cylindrical or other cross sectional contour, and still be within the scope of the present invention.

The windings of the insulated conductor wire 17 would then be effectively wound longitudinally of the non-flexible tubular core, said windings being then parallel with the longitudinal axis of the dielectric tubes and the work piece to be tested, to create a non-polar flux field circularly of the work piece, said flux to thus be caused to create pole patterns at defect lines in the work piece which are located nearly parallel to the longitudinal axis of the flux field.

The terminal of the windings of said helix of Figs. 1 and 2 are adjacent to the split ends 16—16, and are adapted to be respectively connected by flexible or other conductor extensions 22—22 to the terminals 23—23 of a suitable source of current supply 24. Said flexible tube and helix may be opened at the split ends 16 and laid out flat as in Fig. 3 or wrapped around an elongated structure 11 of magnetic material to be tested, with the convolutions closely adjacent to said structure, as in Fig. 2. Direct current from the source 24, passing through the helix will generate circular lines of magnetic flux indicated by the dotted lines at 27, 28, Fig. 2, passing circumferentially around the axis of the coil within and without the helix and in said work piece, and largely in said magnetic work piece as at the lines 27. Finely divided magnetic powder 31, in oil suspension or otherwise, is placed on the face of the work piece 11, whereby the flux lines 27, which are transverse to the axis of the work piece will cause the magnetic powder to collect on and disclose patterns of flaws or defects 30 that are parallel or nearly parallel to the longitudinal axis of the work piece 11.

The flexible core 15, in Figs. 1 to 3, the coil may be wrapped around objects of square, round or other irregular shape, in a way to dispose the coils very close to surfaces of the magnetic work piece, thus to render the magnetic lines in the magnetic work piece at said surfaces as strong as possible. The windings may be in one layer as in Fig. 1 or in two or more superposed layers, as the series windings 19a, 20a of Fig. 2a, to increase the strength of the magnetic field, with low current consumption.

If desired, the flexible core 15 may be removed or omitted, as the wire helix can retain its shape without the core.

The coil 10 may be placed within a hollow article as shown in Fig. 4. This coil is particularly adapable for producing circular magnetization around the inner face of an air-cooled aircraft engine cylinder 33 which in the present instance, consists of an aluminum cylinder closing head 34 rigidly attached to the magnetic piston cylinder 33, whereby longitudinal flaws in the cylinder 33, if present may be detected.

The core 15 or 15a (Fig. 6) as previously described, may be made of any suitable stiff or non-flexible dielectric material or non-magnetic metal, if the coil is not to be used around work pieces as shown in Fig. 1, and the split 16 may be omitted. If the particular uses do not require it, the core or coil need not be split or flexible. For instance, the use of the coil as in Fig. 4 or 6 would allow the core to be of stiff or unyielding, dielectric material. The convolutions should be as near as possible to the external contour of the work piece being tested; and the core and coil could be made of permanent shape to conform with the particular shape of the articles to be tested.

Where the tube 15a is made of non-magnetic metal, as previously stated, the application of alternating current to the winding adapts the coil to become a demagnetizer.

A flexible coil, like that shown in Figs. 1, 2 and 3 made with a non-magnetic belt core, may be wrapped flexibly around work pieces like 11, and upon application of alternating current, and cutting off the same may also act as a demagnetizer.

With the flexible coil, as in Fig. 1, the coil may be laid out flat against a flat magnetic work piece 28a, as in Fig. 3, causing the magnetic flux to move within the piece 28a along lines as at 31, to test defects transverse to such lines. In this test, the flattened coil may be rotated, relative to the plane of the work piece, to locate surface defects in different angular positions thereon.

In Fig. 6, a non-flexible, dielectric coil 10 is shown immersed in a liquid holding iron powder 37 in suspension, in a vessel 38, with the work piece 31 to be tested immersed in the liquid within the coil. This method is very sensitive, particularly if the work piece be closely adjacent to the coil. If desired, the vessel could fit within the coil, to prevent the liquid from touching the coil. In Fig. 6, the coil 10 may be assumed to have a solid dielectric core 15a, as the type of work piece 31 shown under test does not require a flexible or split coil.

The means and methods above described have the following advantages:

(a) The work piece can be brought to the coil or the coil can be brought to and adjusted to the work piece, whichever is the most practical.

(b) It requires less time and causes less damage to the work piece to be tested to insert the coil in or over the work piece or to insert the work piece in or around the coil than it does to set the work between contact heads to pass current through the work piece or to place the work piece on a bar and pass current through the bar.

(c) In placing a bar through a hollow work piece, it is often necessary to rest the work piece on the bar; and at the line of contact, the indicating solution becomes smeared so that the presence of a pattern of a defect may be destroyed. This does not happen with the present improved method since the coil and work piece may be set vertical and rest on their ends, with the work piece and the test coil spaced from each other, without contact therebetween.

(d) In prior practice in passing a current through a hollow part to be treated, the indicating solution cannot be applied to the bore while the magnetizing current is acting, because the ends may be blocked off by the contact connections for the current. On the other hand, when a hollow work piece is placed in my coil, or my coil placed in the work piece, the indicating solution can be applied through the open end while the magnetizing current is on.

(e) All danger of burning the ends of parts at the contact points is eliminated.

(f) By filling the inside of the coil with the indicating liquid suspension of the paramagnetic powder as in Fig. 6, the work piece can be immersed and then the magnetizing current passed through the coil. This is very desirable for high sensitivity. This applies to either solid or hollow work pieces.

(g) By the use of a large number of winding convolutions preferably overlaid as in Fig. 2a, the strength of the magnetic field is greatly increased without increasing the amperage of the current source. A very strong field can be developed with small amperage at the source. This is a distinct advantage over the method of passing current through the conductor bar or through the work piece, which requires a very high amperage to be furnished at the source.

(h) The coil as shown can be used as a demagnetizer for eliminating magnetization, by passing A. C. current through and gradually decreasing the current.

(i) By applying annular or helical windings over or under the longitudinal windings, and arranging the proper connections, a combination tool can be constructed that will magnetize or de-magnetize either circular or bi-polar by the simple throwing of a switch.

It should be noted that the utility of my magnetizing coil is not limited to its use as a testing tool. It can also be made into a very efficient apparatus for making permanent magnets to be used for any purpose desired. It can be used wherever its type of flux is desired.

For the core 15 as in Fig. 1 I may use rubber, leather, fabric, mesh, link or other flexible belt arrangement so that the complete belt of wire can be formed into a cylinder or other shape whenever desired. It is not necessary that the belting form shall remain permanently within the coil. The wire can be formed and then the form removed. The remaining flat coil will have flexibility and can be rolled into a cylinder, whose long axis is parallel with the windings, and can be used for the same purposes as the coil with the fixed core.

This arrangement of a split flexible coil as in Fig. 1 has a distinct advantage in that it can be applied around the mid-section of parts with enlarged ends, or with obstructions at the ends that would prevent the passing of a suitable size coil over the ends. This arrangement is particularly suited for a magnetizer or de-magnetizer to be applied to the members of a structure that are inaccessible to a coil longitudinally wound on a continuous, non-flexible, hollow form.

It is evident that an important principle involved in this invention, is the development of circular magnetization in an object by means of a coil wound lengthwise of a tubular core instead of circumferentially.

Other forms of the invention are shown in Figs. 7 to 9. The form of Fig. 7 consists of a hollow tube 40 of copper, aluminum, or other non-magnetic electrical conductor, closed on one end with a head plate 41a of same material, to which is joined an inner conductor 42a of same material. This conductor 42a is joined to the center of the head plate 41a and extends up through the axis of the tube 40 as shown. The tube 40 and the exposed end of the conductor 42a are respectively fitted with electrical terminals 43 and conductors 44 so that they may be connected to an electric circuit source. When thus connected the current flows longitudinally down the walls of the tube on all sides thereof, through the end plate and along the rod, causing field of circular magnetization around the outside of the tube, around the inner wall and around the bar. The field around the outside of the tube will magnetize the wall of hollow piston or other body 45 when the magnetizing tool is inserted therein and excited thus creating flux lines 31. This form of the invention has many of the advantages above described of the forms of Figs. 1 to 6. The device develops circular magnetization outside the walls. It can be used to insert into holes or hollow parts as in Fig. 7. This tool has many of the advantages described for the forms of Figs. 1 to 6. In use D. C. current of high amperage or A. C. current of high amperage is necessary to operate this latter form of exploring device.

Adverting to the flattened flexible form of coil, shown in Fig. 3, as previously noted, it may be used in the flat, for exploring flat surfaces of magnetic materials for defects and by turning the flat coil at angles near the plane surface of the flat work piece 28a, the various defects are brought out by the successive alteration of the flux lines, by such movement. Further, the flat coil shown in Fig. 3, may be wound on an inflexible dielectric core, and thus may be used over large surfaces of a magnetic work piece, a portion at a time, and thus the entire surface of a large work piece may be explored.

In the event that the surfaces of the large work piece are irregular, the flat coil may be wound on a very flexible core, thereby to be adjustable to such surface irregularities.

In Figs. 10 to 14 inclusive are shown further modified forms of exploring coil based on the principles described for the preceding structures, having all of the advantages and functions noted for the previous structures, including some added advantages and functions, as will now be described.

The device shown in the last noted figures is so constructed as to be formed of two inflexible semi-cylindrical core shells 49 and 50, Figs. 10 and 13, which, at their elongate meeting edges, are provided with outstanding, winding retaining edges 51, whereby the outer ends of the conductive windings 52—52', are prevented from slipping off from the shells.

The windings on said half cores or shells are wound parallel to the axis of the assembled half shells, when cylindrically assembled, as in Figs. 11, 12 and 13. These open half shell cores, due to their individual structures, are very easy to separately wind, as will be apprehended.

The half shells are each provided with mating electrical connections whereby, when they are assembled together to form a complete coil, as in Figs. 11, 12 and 13, each appurtenant winding on each shell closes with the coacting winding on the mating shell, thereby to connect said windings in series, to form a continuous circuit from terminal 53 to terminal 54.

In other words the winding on shell 49 commences at the terminal 53, is wound longitudinally on the shell by winding 52, and the winding 52 terminates at and is electrically connected to a prong 54', which is fixed in shell 49 and extends upwardly from the meeting edge 55 of shell 49, Figs. 10 and 14.

Correspondingly, the winding 52' on shell 50 commences at terminal 54 and terminates at, and is electrically connected to an eyelet 56, shown dotted in Fig. 12. Eyelet 56, when the shells are pressed together in edge to edge contact, they form a closed cylindrical coil, plug 54' and eyelet 56 thus joins the separate longitudinal windings 52 and 52' into a single series circuit. The opposite corners of the contacting edges of both semi-cylindrical shells 49 and 50 are provided with matching prongs 51 and eyelets 58, 59, not in the electrical circuit, but which form mechanical means for frictionally and releasably locking the half magnets together, to form a complete, circular flux developing coil.

The advantages and functions of the structures shown in Figs. 10 to 14 inclusive, are the same as those disclosed for all of the previously described structures. All of the herein shown and described structures are useful for exploring magnetic work pieces for flaws, may be used for making permanent magnets, are also useful for demagnetizing magnetic parts, and in some instances, as outlined herein, may be made into electro magnets developing a bi-polar flux field. The split structures shown in Figs. 10 to 14 permit of exploring work pieces 11, as described for Figs. 1 and 2.

The coils described herein may be provided with solid dielectric cores, solid magnetic cores, split dielectric or magnetic cores, or flat dielectric flexible cores, or flat non-flexible dielectric or magnetic cores, all directed to the accomplishment of the herein outlined resultant ends.

In many instances, the work piece herein may be charged by the flux field, and thereafter the exploring coil removed, and then the paramagnetic powder sprinked, dusted or otherwise applied to the surface of the work piece, and the flaw disclosing patterns will be formed by the residual magnetism in the work piece.

A cylindrical or tubular steel ring may be circularly magnetized by placing it inside or outside of one of the coils of Figs. 1, 6 or 10 to 13, and applying direct current to the coil, after which a portion of the ring may be cut out to form poles. Or the ring may be cut into halves or more pieces. In such cases the cut ring or each piece becomes a permanent magnet. Thus said coils may be used in the manufacture of horse-shoe or similar magnets.

I claim as my invention:

1. A method for testing for longitudinal flaws in elongated structures of magnetic material, said method comprising causing an electric current to pass in one direction through a helical path, each convolution of which comprises portions disposed longitudinally along and adjacent to, and respectively within and without a tubular surface of limited length, said portions being substantially parallel to each other and the axis of said surface and substantially enclosing said surface within and without; placing said helix with said axis longitudinal to the elongated structure of magnetic material to be tested, with the convolutions adjacent to said material; whereby electric current passing through the helix will generate magnetic flux passing circumferentially around the axis of said surface within and without the helix and tubular surface and largely in said magnetic structure; whereby the magnetic flux lines are transverse to the length of the structure and may detect flaws that are non-transverse to the length of the structure.

2. A device for testing for longitudinal flaws in elongated structures of magnetic material, said device comprising means providing a helical path, each convolution of which comprising portions disposed longitudinally along and adjacent to, and respectively within and without a tubular surface of limited length, said portions being substantially parallel to each other and the axis of said surface and substantially enclosing said surface within and without; and means for causing an electric current to pass in one direction through said path; said helix being placed with said axis longitudinal to the elongated structure of magnetic material to be tested, with the convolutions adjacent to said material; whereby electric current passing through the helix will generate magnetic flux passing circumferentially around the axis of said surface within and without the helix and tubular surface and largely in said magnetic structure; whereby the magnetic flux lines are transverse to the length of the structure and may detect flaws that are non-transverse to the length of the structure.

3. A device for testing for flaws in structures of magnetic material, said device comprising a helix of insulated non-magnetic conductor wire, each convolution of the helix comprising portions disposed longitudinally along and adjacent to, and respectively within and without the surface of a tubular surface of limited length; the space at the axis of, and bounded by, the tubular surface being largely vacant for the reception of the test piece; the terminal ends of said helix being provided with flexible conductors adapted to be respectively connected to the terminals of a source of current.

4. A device for testing for longitudinal flaws in elongated structures of magnetic material, said device comprising a somewhat flexible substantially continuous helix of insulated flexible non-magnetic conductor wire, each convolution of the helix comprising portions disposed longitudinally along and adjacent to a tubular surface of limited length, said portions being respectively within and without the surface and substantially parallel to each other and the axis of said surface; the terminal ends of said helix being adjacent to each other and separable from each other and adapted to be respectively connected by flexible conductors to the terminals of a source of current; whereby said flexible helix may be opened at the said ends and wrapped around an elongated structure of magnetic material to be tested, with the convolutions adjacent thereto; whereby electric current passing through the helix will generate magnetic flux passing circumferentially around the axis of the tubular surface within and without the tubular surface and largely in said magnetic structure; whereby the magnetic flux lines are transverse to the length of the structure and may detect flaws that are non-transverse to the length of the structure.

5. A device for testing for longitudinal flaws in elongated cylindrical structures of magnetic material, said device comprising a flexible, tubular body of non-magnetic material such as leather belting, said body having a longitudinally split therein; and a helix of insulated conductor wire substantially covering the body, each convolution of the helix comprising portions disposed over the end edges of the body and portions extending longitudinally along the respective inner and outer faces of the tube substantially parallel to each other and the axis of the tube; a source of current; the terminal ends of said helix being adjacent to the split, on opposite sides of the split, and connected by flexible conductors to the respective terminals of the source; whereby said flexible tube and helix may be opened at the split and wrapped around an elongated structure of magnetic material to be tested, with the convolutions adjacent thereto; whereby electric current passing through the helix will generate magnetic flux passing circumferentially around the axis of the helix within and without the helix and said body and largely in said magnetic structure; whereby the flux lines are transverse to the length of the structure and may detect flaws that are non-transverse to the length of the structure.

6. A device for testing for longitudinal flaws in hollow elongated structures of magnetic material, said device comprising a pair of spaced concentric elongated members of non-magnetic electrically conducting material, electrically joined at one end, the outer member being tubular, the inner member being longer and projecting at its free end from the free end of the other member; a source of current; terminals secured to said free ends; and flexible conductors by which said terminals are respectively connected to the terminals of the source; whereby said members may be placed longitudinally within the hollow elongated structure of magnetic material to be tested with a portion of the outer member adjacent to said material; whereby electric current passing longitudinally through the members will generate magnetic flux passing circumferentially around the axis of the members largely within the material of said magnetic structure; whereby the magnetic flux lines are transverse to the length of the structure and may detect flaws that are non-transverse to the length of the structure.

7. A device for testing for longitudinal flaws in hollow elongated structures of magnetic material, said device comprising a tubular member of non-magnetic electrically conducting material; a source of current; terminals secured to the ends of the member; and flexible conductors by which said terminals are respectively connected to the terminals of the source; whereby said member may be placed longitudinally within the hollow elongated structure of magnetic material to be tested with a portion of the member adjacent to said material; whereby electric current passing longitudinally through the member will generate magnetic flux passing circumferentially around the axis of the member largely within said magnetic structure; whereby the magnetic flux lines are transverse to the length of the structure and may detect flaws that are non-transverse to the length of the structure.

8. A device for finding surface flaws in magnetic material, said device comprising a tubular body of non-magnetic material; and a helix of insulated conductor wire substantially covering the body, each convolution of the helix comprising portions disposed over the end edges of the body and then longitudinally along the respective inner and outer faces of the tube substantially parallel to each other and the axis of the tube; the terminal ends of said helix being adjacent and adapted to be connected to flexible conductors.

9. A device for testing for flaws in the surface structure of a magnetic work piece, said device comprising a flexible flat core for providing an assembly of adjacent substantially parallel electrically conductive paths; a source of current; means for connecting said paths in circuit with said source for causing a large number of amperes of electric current to pass in the same direction through said paths, whereby said device is adapted for placing said paths adjacent to the surface of the magnetic work piece.

10. A device for exploring a magnetic work piece for structural flaws comprising a pair of separable and elongate semi-cylindrical dielectric shells each having an assembly of substantially parallel, adjacent electrical conductors arranged in series and parallel to the axes of said shells and connective terminals at the ends of said conductors whereby the said shells when assembled to each other will form a continuous electrical circuit.

11. A device for exploring a magnetic work piece for structural flaws comprising a pair of separate, dielectric semi-cylindrical shells each shell having an elongate, conductive winding thereon, said windings being wound parallel to the axes of said shells, a terminal on one end of each winding for connecting into a source of electric current, each of said shells having connective terminals at their other ends which separably connect the windings of each shell into a closed series connection and means on said shells for operatively holding the wound shells together when they are assembled together.

12. A device for demagnetizing a magnetic work-piece comprising a tubular non-magnetic core piece, conductive windings on said core, said windings being wound around the tubular core internally and externally of said core and parallel to the axis thereof, and connectors on the opposite ends of said windings for connecting the same into a source of alternating current to create said demagnetizing, circular flux field.

13. A device for demagnetizing a magnetic work-piece comprising a tubular non-magnetic core piece comprising separable half-sections, conductive windings upon said sections, said windings being transversely wound around the opposed surfaces and edges of said core, and connectors on the opposite ends of said windings of each section for connecting the same into a source of alternating current, to create a demagnetizing circular flux field.

14. A method for making magnets which comprises providing an annular body of magnetic material; winding about said body a helix of insulated conductor wire substantially covering the body, each convolution of the helix comprising portions disposed over the edges of the body, and portions extending along the respective inner and outer faces of the body; passing direct current through said helix until the body is magnetized; and transversely cutting the annular body in two or more places to provide poles.

15. A method for creating a flux field in elongated structures of magnetic material, said method comprising causing an electric current to pass through a helical path, each convolution of which comprises portions disposed longitudinally along and adjacent to, and respectively within and without a tubular surface of limited length, said portions being substantially parallel to each other and the axis of said surface and substantially enclosing said surface within and without; placing said helix with said axis longitudinal to the elongated structure of magnetic material, with the convolutions adjacent to said material; whereby electric current passing through the helix will generate magnetic flux passing circumferentially around the axis of said surface within and without the helix and tubular surface and largely in said magnetic structure; whereby the magnetic flux lines are transverse to the axis of the structure.

16. A device for creating a flux field in elongated structures of magnetic material, said device comprising means providing a helical path, each convolution of which comprising portions disposed longitudinally along and adjacent to, and respectively within and without a tubular surface of limited length, said portions being substantially parallel to each other and the axis of said surface and substantially enclosing said surface within and without; and means for causing an electric current to pass through said path; said helix being placed with said axis longitudinal to the elongated structure of magnetic material, with the convolutions adjacent to said material; whereby electric current passing through the helix will generate magnetic flux passing circumferentially around the axis of said surface within and without the helix and tubular surface and largely in said magnetic structure; whereby the magnetic flux lines are transverse to the axis of the structure.

17. A method for testing for flaws in a hollow magnetic body closed except at one opening, which method comprises causing an electric current to pass from an exterior source through said opening and in a path within the hollow and then out said same opening to the source to form a circuit; and placing said path adjacent to the inner face of the wall of said body; whereby electric current passing through the path will generate magnetic flux in the wall at said inner face.

18. A method for testing for flaws in a hollow magnetic body having an opening from the hollow to the exterior, which method comprises causing an electric current to pass in one direction from an exterior source inwardly through said opening and in a path within the hollow and then in the opposite direction out said opening to the source to form a circuit; placing said path adjacent to the inner face of the wall of said body, whereby electric current passing through the path will generate magnetic flux transverse to said path in said wall adjacent to said inner face and path, whereby the magnetic flux lines may be used to detect flaws in said face.

19. A method for testing for flaws in a hollow magnetic body closed except at one opening, which method comprises causing an electric current to pass from an exterior source through said opening and through a loop both elements of which and their connection are within the hollow, and then out said same opening to the source to form a circuit; placing the length of one of said elements adjacent to the inner face of the wall of said body, whereby electric current passing through the paths will generate magnetic flux in said wall adjacent to said inner face, whereby the magnetic flux lines may be used to detect flaws.

20. A method for testing for flaws in a hollow magnetic body closed except at one opening, which method comprises causing an electric current to pass from an exterior source through said opening and in a common direction in substantially parallel paths within the hollow and then out said same opening to the source to form a circuit; placing said paths adjacent to the inner face of the wall of said body; whereby electric current passing through the paths will generate magnetic flux transverse to said paths largely in said wall adjacent to said inner face; whereby the magnetic flux lines may be used to detect flaws that are transverse or inclined to said paths.

21. A method for testing for longitudinal flaws in a hollow elongated magnetic cylindrical body closed at one end and open at the other end, which method comprises causing an electric current to pass from an exterior source through said opening end and along adjacent paths substantialy parallel to each other and the axis of said body within the hollow of said body adjacent to the inner face of the cylindrical wall of said body and then back through said open end to the source; whereby electric current passing through the paths will generate magnetic flux in said cylindrical wall adjacent to said inner face; whereby the magnetic flux lines are transverse to the axis of the cylindrical body and may be used in the detection flaws that are longitudinal or inclined to the generatrix of said inner face.

22. A method for testing for longitudinal flaws in a hollow elongated magnetic cylindrical body closed at one end and open at the other end, which method comprises causing an electric current to pass from an exterior source through said open end and along adjacent paths in series with, and substantially parallel, to each other and the axis of said body within the hollow of said body adjacent to the inner face of the cylindrical wall of said body and then back through said open end to the source.

23. A method for testing for longitudinal flaws in a hollow elongated magnetic cylindrical body closed at one end and open at the other end, which method comprises causing an electric current to pass from an exterior source through said open end and along a helical path, each convolution of which comprise portions disposed longitudinally along and adjacent to, and respectively within and without a tubular surface of limited length, said portions being substantially parallel to each other and the axis of said surface and substantially enclosing said surface within and without; placing said helix entirely within the hollow of said body with the outer portions of all the convolutions adjacent to the inner face of the cylindrical wall of said body; whereby electric current passing through the helix will generate magnetic flux passing circumferentially around the axis of said surface within and without the helix and tubular surface and largely in said cylindrical wall adjacent to said inner face; whereby the magnetic flux lines are transverse to the axis of the cylindrical body and may be used to detect flaws that are longitudinal or inclined to the generatrix of said inner face.

24. A method for creating a flux field in elongated structures of magnetic material; said method comprising causing electric current to pass from one terminal of a source then through adjacent paths in substantially a common direction and then back to the source to form a circuit; placing said paths adjacent to a limited portion of a face of the magnetic material and substantially parallel with the axis of the structure while maintaining said paths remote from other portions of the structure; whereby electric current passing through the paths generate magnetic flux passing transverse to the paths and the axis of the structure, and is adapted for testing for flaws longitudinal to and inclined to said axis.

25. A method for creating a flux field in a structure of magnetic material, said method comprising causing electric current to pass from one terminal of a source then through a path and then back to the source to form a circuit; placing said path adjacent to a surface of the magnetic material while maintaining said circuit and structure free of linked relation with each other; whereby electric current passing through the path generates magnetic flux passing transverse to the path largely within said material at and near said surface, and is adapted to aid in testing for flaws which are sufficiently non-transverse to said paths.

26. A method for creating a flux field in a structure of magnetic material having an extended face, said method comprising causing electric current to pass from one terminal of a source then through adjacent paths in substantially a common direction and then back to the source to form a circuit; placing said paths side-by-side adjacent to a limited portion to a surface of the magnetic material while maintaining said paths remote from other portions of said face; whereby electric current passing through the paths generate magnetic flux passing transverse to the paths largely within said material at and near said face.

27. A method for creating a flux field in a structure of magnetic material, said method comprising causing electric current to pass from one terminal of a source then through adjacent paths in substantially a common direction and then back to the source to form a circuit; placing said paths adjacent to a limited portion to a face on one side only of the magnetic material while maintaining said paths remote from the other side of the structure; whereby electric current passing through the paths generate magnetic flux passing transverse to the paths largely within said material at and near said face.

28. A method for creating a flux field in magnetic structures free of openings passing therethrough, said method comprising causing electric current to pass from one terminal of a source then through adjacent paths in substantially a common direction and then back to the source to form a circuit; and placing said paths adjacent to a surface of the magnetic structure; whereby electric current passing through the paths generate magnetic flux passing transverse to said paths largely within said material at and near said face.

29. A method for creating a flux field in an extended structure of magnetic material having an extended surface; said method comprising causing electric current to pass from one terminal of a source then through adjacent paths in substantially a common direction and then back to the source to form a circuit; said paths being adjacent to said extended surface and substantially parallel with each other while maintaining said circuit free of complete encirclement of said structure; whereby electric current passing through the paths generate magnetic flux passing transverse to the paths effectively within said material at and near said surface; whereby the magnetic flux lines may be transverse to the face of the structure.

30. A method for creating a flux field in a structure of magnetic material, said method comprising causing electric current to pass from one terminal of a source then in substantially a common direction through adjacent paths and then back to the source to form a complete circuit; and afterwards, while maintaining said circuit continuously unbroken, placing said paths adjacent to a surface of the magnetic material; whereby electric current passing through the paths generate magnetic flux passing transverse to the paths largely within said material at and near said surface.

31. A device for testing for flaws in the surface structure of a magnetic work piece, said device comprising a flat core for providing an assembly of adjacent substantially parallel electrically conductive paths; a source of current; means for connecting said paths in circuit with said source for causing a large number of amperes of electric current to pass in the same direction through said paths, whereby said device is adapted for placing said paths adjacent to the surface of the magnetic work piece.

32. A method for making magnets which comprises disposing magnetic material, adapted to be permanently strongly magnetized, in annular arrangement to form a magnetic circuit substantially free of any air gap; winding about said material a helix of insulated conductor wire; passing current through said helix until the body is strongly permanently magnetized; and then separating said material at one, two or more places to provide separate permanent magnets having poles.

33. A method for making magnets which comprises providing a completely annular body of magnetic material free of any air-gap and adapted to be permanently magnetized and suitable for cutting into magnet parts suitable for separate magnets; winding about said body a helix of insulated conductor wire; passing direct current through said helix until the body is permanently magnetized, thereby simultaneously permanently magnetizing said magnet parts, thus saving time; strong magnetization being effected with relatively small current because of the absence of air gaps, poles and stray magnetism; and then transversely cutting the annular body in two or more places to provide separate magnets having poles.

34. A method for making magnets which comprises providing a completely annular body of magnetic material free of any air gap and adapted to be permanently magnetized and suitable for cutting into magnet parts suitable for separate magnets; winding about said body a helix of insulated conductor wire substantially covering the body, each convolution of the helix comprising portions disposed over the edges of the body, and portions extending along the respective inner and outer faces of the body; passing direct current through said helix until the body is permanently magnetized, thereby simultaneously permanently magnetizing said magnet parts, thus saving time; strong magnetization being effected with relatively small current because of the absence of air gaps, poles and stray magnetism; and then transversely cutting the annular body in two or more places to provide separate magnets having poles.

RICHARD R. MOORE.